US011981184B2

(12) United States Patent
Puzenat et al.

(10) Patent No.: US 11,981,184 B2
(45) Date of Patent: May 14, 2024

(54) ELECTRICAL CONNECTION DEVICE FOR A HEATING DEVICE

(71) Applicant: Valeo Systemes Thermiques, Le Mesnil Saint Denis (FR)

(72) Inventors: Bertrand Puzenat, Le Mesnil Saint Denis (FR); Serif Karaaslan, Le Mesnil Saint Denis (FR); Mickael Bigey, Le Mesnil Saint Denis (FR); Frèdèric Pierron, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 1062 days.

(21) Appl. No.: 16/089,324

(22) PCT Filed: Mar. 9, 2017

(86) PCT No.: PCT/FR2017/050525
§ 371 (c)(1),
(2) Date: Aug. 17, 2020

(87) PCT Pub. No.: WO2017/168067
PCT Pub. Date: Oct. 5, 2017

(65) Prior Publication Data
US 2020/0369121 A1    Nov. 26, 2020

(30) Foreign Application Priority Data

Mar. 29, 2016  (FR) ...................................... 1652690

(51) Int. Cl.
*B60H 1/22* (2006.01)
*H01R 9/22* (2006.01)
(52) U.S. Cl.
CPC ........... *B60H 1/2225* (2013.01); *H01R 9/226* (2013.01)

(58) Field of Classification Search
CPC ............................ B60H 1/12225; H01R 9/226
(Continued)

(56) References Cited

U.S. PATENT DOCUMENTS 6,062,916 A *  5/2000  Gladd ..................... H01R 9/223
                                                       439/82
7,957,156 B2 *  6/2011  Palomo ................ H01R 12/585
                                                       361/779

FOREIGN PATENT DOCUMENTS

EP          0722264 A2    7/1996
EP          1998406 A1    12/2008
(Continued)

OTHER PUBLICATIONS

Machine Translation of EP1998406A1; Mar. 2022 (Year: 2022).*
(Continued)

*Primary Examiner* — Nathaniel E Wiehe
*Assistant Examiner* — Thomas J Ward
(74) *Attorney, Agent, or Firm* — Osha Bergman Watanabe & Burton LLP

(57)  ABSTRACT

The invention relates to an electrical connection device (2) for electrically connecting a first pad (10) and a second pad (12) of an electrical power source (4) and electrical contacts (18, 19) of heating modules (6, 7), the first pad (10) having a first electrical potential that differs from that of the second pad (12), said connection device (2) comprising: —at least one first electrically conductive tongue (32), intended to be electrically connected to the first pad (10) and to at least one electrical contact (19) of at least one heating module (6, 7); —at least two second electrically conductive tongues (41), intended to be electrically connected to the second pad (12), and to other electrical contacts (18) of at least one heating module (6, 7), characterized in that the connection device (2) is electrically capable of electrically connecting the first pad (10) and the second pad (12) and the electrical contacts (18,
(Continued)

19) of a single heating module (6, 7) and that the connection device (2) is also capable of electrically connecting the first pad (10) and the second (12) and the electrical contacts (18, 19) of multiple heating modules (6, 7), the number of electrical contacts (18, 19) of this heating module (6, 7) and of each of these heating modules (6, 7) potentially being variable.

13 Claims, 5 Drawing Sheets

(58) Field of Classification Search
 USPC ........................................................ 219/202
 See application file for complete search history.

(56) References Cited

FOREIGN PATENT DOCUMENTS

| EP | 2056036 A1 | 5/2009 | |
|---|---|---|---|
| EP | 2863143 A1 | 4/2015 | |
| FR | 1998406 A1 * | 12/2008 | ............... F24H 3/06 |
| WO | 2014/154579 A1 | 10/2014 | |

OTHER PUBLICATIONS

International Search Report issued in corresponding International Application No. PCT/FR2017/050525, dated May 22, 2017 (6 pages).

* cited by examiner

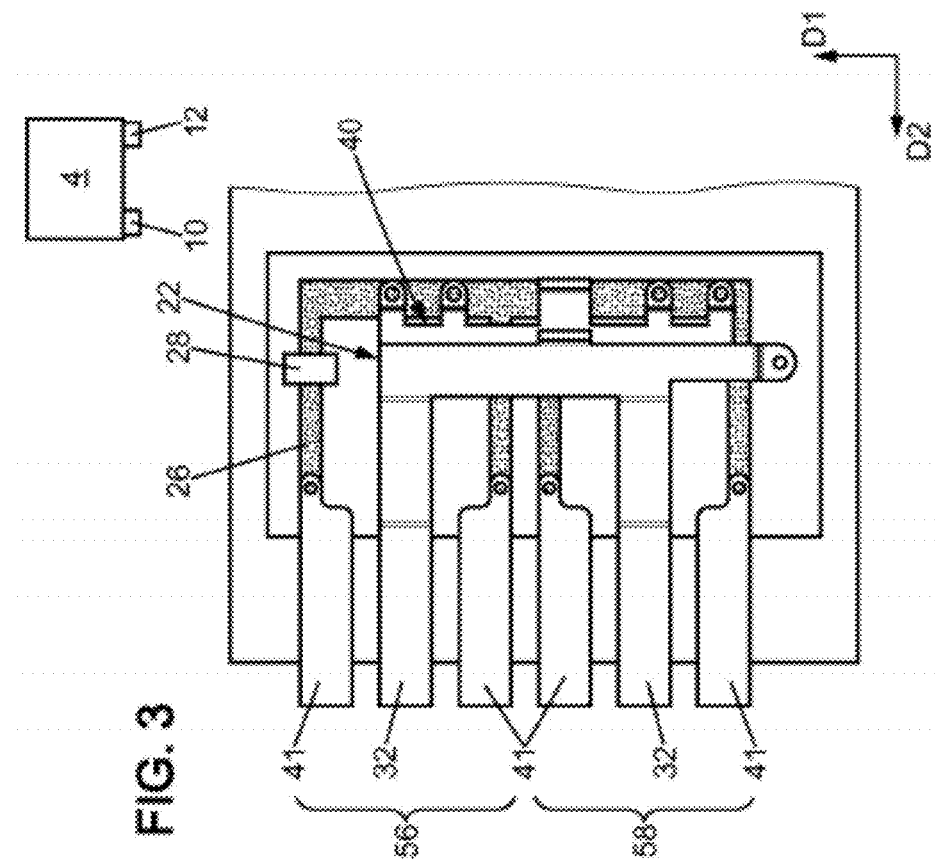
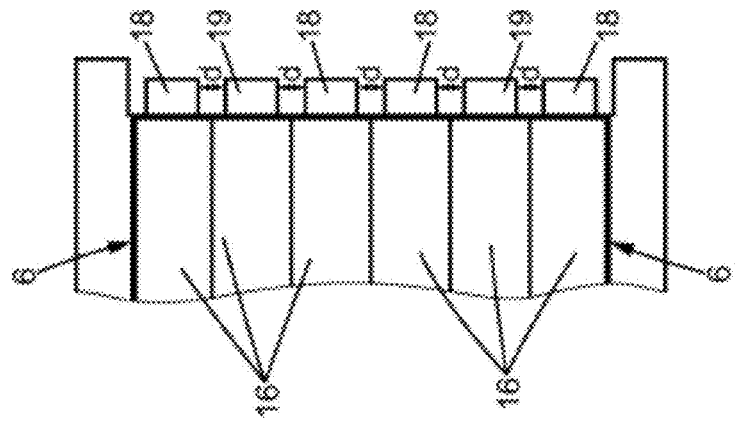
FIG. 3

ELECTRICAL CONNECTION DEVICE FOR A HEATING DEVICE

The present invention relates to the field of ventilation, heating and/or air-conditioning installations, in particular for motor vehicles.

In particular, the invention relates to an electrical connection device intended for connecting an electrical power supply source and heating modules of a heating device of a ventilation, heating and/or air-conditioning installation. It also relates to a heating device and to a ventilation, heating and/or air-conditioning installation.

The ventilation, heating and/or air-conditioning installations fitted to vehicles often include an additional electrical heating device for the purpose of rapidly generating heat in these vehicles, for example when it is desired to heat up the passenger compartment quickly while the engine is still cold. Such an additional heating device includes electrical resistor-based heating modules. Currently, each additional heating device is designed according to the architecture of the ventilation, heating and/or air-conditioning installation, the size of the passenger compartment and the requirements of the manufacturers (rapid defrosting, large heating capacity at foot level, etc.). Consequently, the additional heating devices mounted in a certain type of vehicle are specific to this type of vehicle.

The object of the present invention is to provide an electrical connection device and an additional heating device having the greatest number of standard parts and being able to be adapted for various heating capacities or for various customer requirements.

To this end, the subject matter of the present invention is an electrical connection device intended for the electrical connection of a first pad and a second pad of an electrical power supply source and electrical contacts of heating modules, the first pad being at a first electrical potential that is different from that of the second pad, said connection device comprising:
  at least one first electrically conductive tab, intended to be electrically connected to the first pad and to at least one electrical contact of at least one heating module;
  at least two second electrically conductive tabs, intended to be electrically connected to the second tab, and to other electrical contacts of at least one heating module,
  characterized in that the connection device is capable of electrically connecting the first pad and the second pad and the electrical contacts of a single heating module and that the connection device is also capable of electrically connecting the first pad and the second pad and the electrical contacts of a plurality of heating modules, the number of the electrical contacts of this heating module and of each of these heating modules being able to vary.

Thus, advantageously, the electrical connection device according to the present invention may be mounted in heating devices that may be fitted with one or more heating modules having a variable number of rows of elements that are capable of generating heat.

Advantageously, the electronic board and the electrical distribution busbar for conducting electric current do not vary regardless of the number of rows of elements that are capable of generating heat fitted to the additional heating device. Standardizing the electronic board and the busbar allows manufacturing costs to be decreased.

Advantageously, in addition, such standardization allows logistics costs to be decreased by decreasing the number of product references to be managed.

According to particular embodiments, the electrical connection device includes one or more of the following features, taken alone or in combination:
  the number of electrical contacts of a heating module is comprised between two and the total number of conductive tabs of the connection device.
  the number of electrical contacts of one or more heating modules electrically connected to the connection device is comprised between two and the total number of conductive tabs of the connection device.
  the electrical connection device is capable of being connected to at least one heating module in a first configuration in which all of the conductive tabs are electrically connected to electrical contacts of the one or more heating modules, and a second configuration in which only a portion of the conductive tabs is electrically connected to electrical contacts of the one or more heating modules.
  the conductive tabs are capable of being electrically disconnected from the corresponding pads of the power supply source.
  when the conductive tabs are connected to heating modules in the second configuration, those conductive tabs which are not electrically connected to electrical contacts of the heating modules are electrically disconnected from the corresponding pads of the power supply source.
  the electrical connection device comprises:
    N first conductive tabs, where N is a natural integer greater than or equal to 1;
    2N second conductive tabs.
  the electrical connection device comprises a first conductive tab arranged between two second conductive tabs.
  the electrical connection device comprises two second conductive tabs arranged side by side.
  the electrical connection device comprises at least two assemblies of conductive tabs arranged side by side, each assembly comprising a first conductive tab arranged between two second conductive tabs.
  the electrical connection device comprises at least two assemblies of conductive tabs arranged side by side, at least one assembly comprising a first conductive tab arranged between two second conductive tabs and at least one assembly comprising a first conductive tab adjacent to a second conductive tab.
  in one and the same assembly, the distance between the first conductive tab and one of the second conductive tabs is equal to the distance between the first conductive tab and the other of the second conductive tabs.
  the first conductive tabs and the second conductive tabs have a main plane that lies in the same plane.
  the second conductive tabs are suitable for being connected to ground or to a negative electrical potential.
  the second conductive tabs are suitable for being connected to a positive electrical potential.
  the one or more heating modules include at least one element capable of generating heat and at least one associated element capable of exchanging heat with the airflow flowing through the one or more heating modules.
  said at least one element capable of generating heat is a resistive element.
  said at least one element capable of generating heat is a positive-temperature-coefficient (PTC) resistive element.

said at least one element capable of generating heat is a positive-temperature-coefficient (PTC) resistive element arranged in or on a carrier such as a bar.

said at least one element capable of generating heat is a resistive element arranged between two electrodes.

said at least one associated element that is capable of exchanging heat is a radiative element.

said at least one associated element capable of exchanging heat is at least one fin through which at least one element capable of generating heat passes, or else insertions such as pleated or corrugated metal strips arranged between elements capable of generating heat.

said at least one element capable of generating heat is arranged between two elements capable of exchanging heat.

the at least one heating module includes an element capable of generating heat arranged between two elements capable of exchanging heat.

the one or more elements capable of generating heat arranged between two electrodes are arranged in a row, the end of the electrodes defining said electrical contacts.

the first electrical linkage includes a first one-piece electrical distribution busbar. This first electrical distribution busbar may preferably include a first conductive strip, two first conductive tabs preferentially preferably being able to be rigidly connected to one of the longer edges of the first strip, a first conductive connection plug preferably being able to be rigidly connected to the opposite edge of the first strip.

the second electrical linkage preferably includes a second one-piece electrical distribution busbar, second conductive tabs and at least one conductive track and switches.

the second electrical distribution busbar may include a second conductive strip, attachment lugs and a second conductive connection plug, which are preferably rigidly connected to the same longer edge of the second strip.

The present invention also relates to an electrical connection device according to one of the above features associated with the one or more heating modules, the electrical contacts of which may be connected to the conductive tabs of the electrical connection device.

The present invention also relates to a heating device intended for heating an airflow circulating inside a ventilation, heating and/or air-conditioning installation, said heating device including a housing, an electrical connection device according to one of the above features, mounted in the housing, and at least one heating module comprising at least two electrical contacts.

Lastly, the present invention relates to a ventilation, heating and/or air-conditioning installation of a motor vehicle including at least one heating device having the features mentioned above.

The invention will be understood better from reading the following description, which is given solely by way of example and with reference to the drawings, in which:

FIG. 3 is a schematic view similar to FIG. 1, in which the heating device is fitted with two heating modules comprising three elements capable of exchanging heat;

In order to simplify the description of the present invention, the additional heating device that is described and illustrated is suitable for being fitted with heating modules having two or three rows of elements that are capable of exchanging heat. However, according to the present invention, the heating device is suitable for being fitted with heating modules having any number of rows of elements that are capable of exchanging heat.

Figure 1:
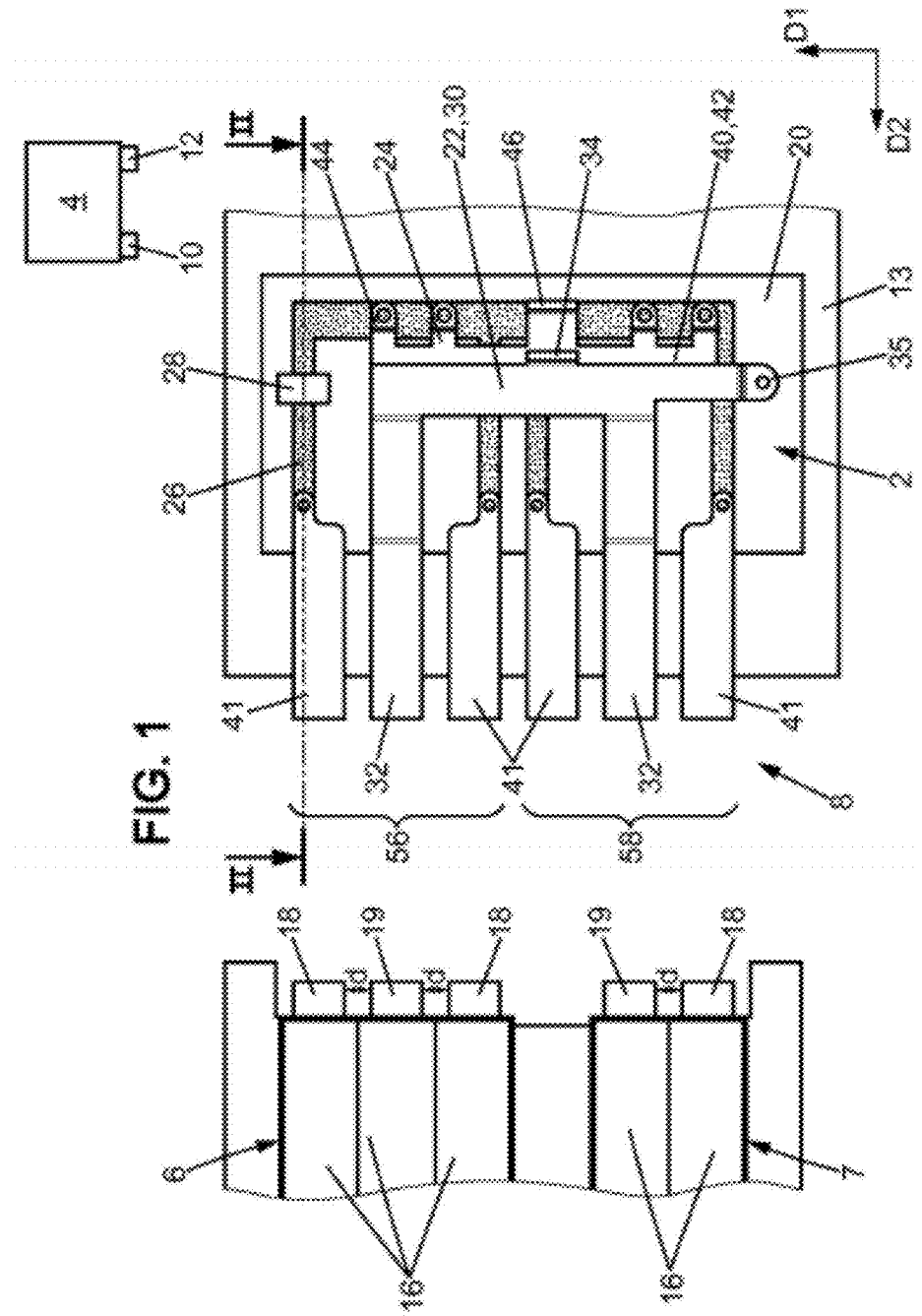
FIG. 1 is a schematic view of a power supply source, and of a heating device according to the invention, the heating device being fitted with a heating module comprising three elements capable of exchanging heat and with a heating module comprising two elements capable of exchanging heat.

In the following description, the terms "top", "bottom", "lower", "upper", "right" and "left" are defined when the connection device according to the invention is arranged as illustrated in FIGS. 1 and 3, and are in no way limiting.

With reference to FIG. 1, the heating device 8 according to the present invention includes a connection device 2 that is intended to be connected to an electrical power supply source 4 and to heating modules 6, 7 of the heating device 8. This heating device 8 is suitable for heating an airflow circulating inside a ventilation, heating and/or air-conditioning installation.

The power supply source 4 generally consists of a battery such as the main battery of the vehicle, an auxiliary battery, or an alternator. The power supply source 4 includes a first, ground pad 10 and a second pad 12 at an electrical potential that is different from that of the first pad, for example at a potential of 12 V, 24 V or 48 V and of 250 V or 330 V for high voltage.

The heating device 8 furthermore includes a housing 13. Heating modules 6, 7 comprising a variable number of electrical contacts 18, 19 may be arranged in the housing 13 of the heating device 8.

A heating module 6 including three rows 16 of elements capable of exchanging heat and three electrical contacts 18, 19, each arranged at one end of a row of elements capable of exchanging heat, is arranged in the housing 13. The electrical contact 19 located at the center is intended to be connected to the second voltage pad 12 and the two lateral electrical contacts 18 are intended to be connected to the first, ground pad 10. The electrical contacts 18 and 19 of a heating module 6 of this type are spaced apart from one another by a distance d.

The elements capable of generating heat arranged between the elements capable of exchanging heat are for example resistors, such as for example positive-temperature-coefficient (PTC) resistors.

Another heating module 7 arranged in the housing 13 is similar to the heating module 6 except that it includes two rows 16 of elements capable of exchanging heat and two electrical contacts 18, 19. One electrical contact 18 is intended for connection to the first, ground pad 10. The other electrical contact 19 is intended for connection to the second, voltage pad 12. The electrical contacts 18 and 19 of a heating module 7 of this type are also both spaced apart from one another by the distance d.

Figure 2:
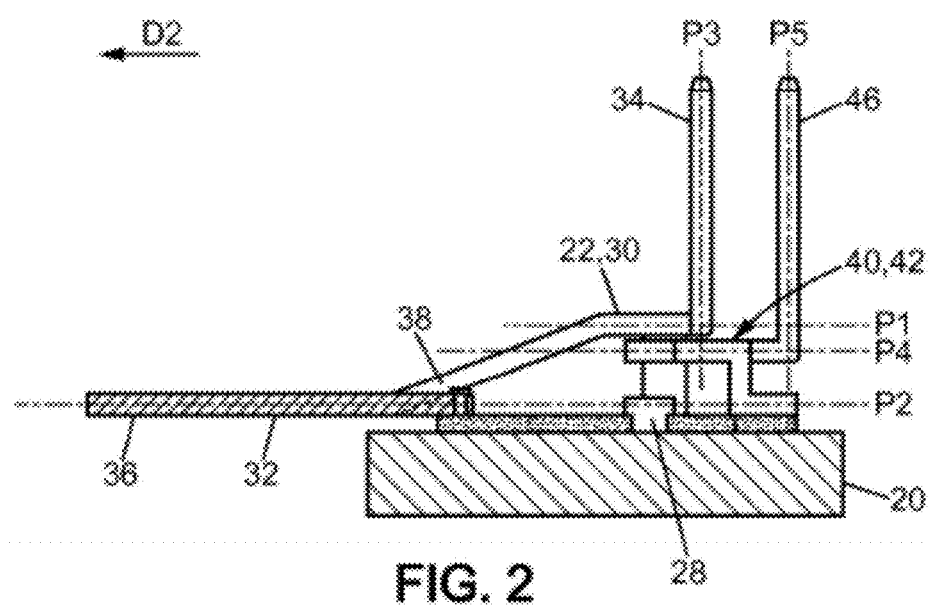
FIG. 2 is a schematic sectional view of the electrical connection device according to the invention along the sectional plane illustrated in FIG. 1.

With reference to FIGS. 1 and 2, the connection device 2 includes a planar carrier formed for example by an electronic board 20, a first electrical linkage intended for connection to the first pad 10 of the battery and a second electrical linkage intended for connection to the second pad 12 of the battery. According to one variant (not described), the first electrical linkage is intended for connection to the second pad 12 and the second electrical linkage is intended for connection to the first pad 10.

The electronic board 20 bears electronic equipment suitable for controlling the selective implementation of certain rows 16 of elements capable of generating heat. To this end, said board bears a conductive track 26, four switches 28, four drivers capable of controlling switches and a control unit capable of controlling the drivers. The drivers and the control unit are not shown in the figures.

The switches 28 are preferably electronic switches such as for example MOSFET switches. A single switch 28 can be seen in FIG. 1, the others being arranged under the electrical distribution busbars.

Figure 4:
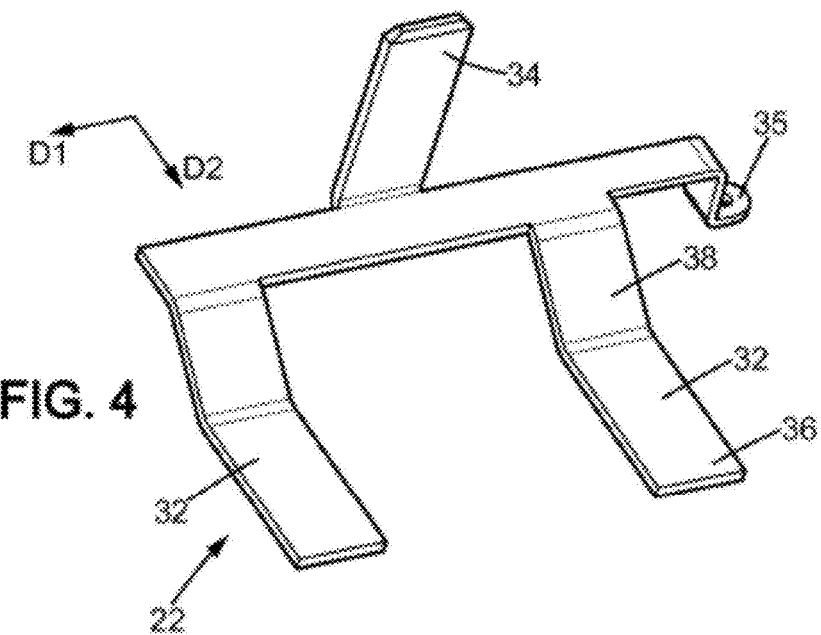
FIG. 4 is a perspective view of a first mounted electrical distribution busbar of the connection device according to the invention.

The first electrical linkage consists of a first one-piece electrical distribution busbar 22 illustrated in FIGS. 1, 2 and 4. This first electrical distribution busbar 22 includes a first conductive strip 30, two first conductive tabs 32 that are rigidly connected to one of the longer edges of the first strip 30 and a first conductive connection plug 34 that is rigidly connected to the opposite edge of the first strip 30.

As shown in FIG. 2, the first strip 30 lies in a first plane P1 parallel to the plane of the electronic board 20. As shown in FIG. 1, the first strip 30 is elongated in a first general direction D1. The two first conductive tabs 32 extend in a second direction D2 perpendicular to the first direction D1. They include an end portion 36 having a main plane that lies in a second plane P2, and a sloped portion 38 linking the end portion 36 to the edge of the first strip 30. The second plane P2 is parallel to the first plane P1. In particular, it is located below the first plane P1. The end portions 36 of the first conductive tabs 32 are intended for connection to the electrical contacts 19 of the heating modules. To achieve this, the end portions 36 of the first conductive tabs protrude with respect to an inner face of the housing 13.

The first electrical connection plug 34 takes the shape of a plate that lies in a third plane P3 that is substantially orthogonal to the first plane P1 of the first strip 30. It is intended for connection to the second pad 12 via electrical linkages (not shown).

As shown in particular in FIG. 4, the first electrical distribution busbar 22 furthermore includes an attachment lug 35, by means of which the first electrical distribution busbar 22 is attached to the electronic board 20. The attachment lug 35 has two bends forming a step allowing the first electrical distribution busbar 22 to be attached in the plane P1 above the electronic board.

The second electrical linkage includes a second one-piece electrical distribution busbar 40, four second conductive tabs 41 and the conductive track 26 and the switches 28.

Figure 5:
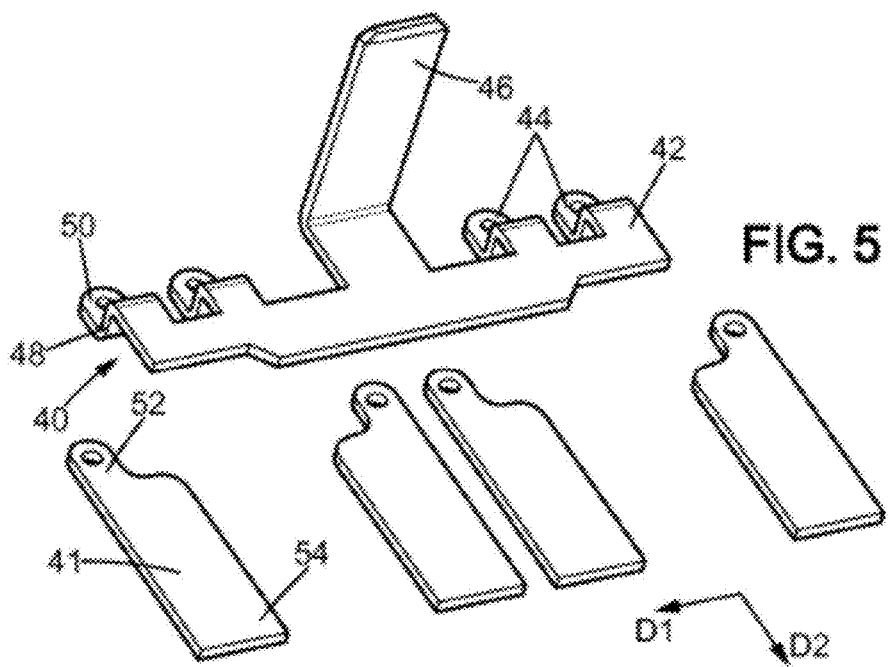
FIG. 5 is a perspective view of a second electrical distribution busbar and of second conductive tabs of the connection device according to the present invention.
Figure 6:
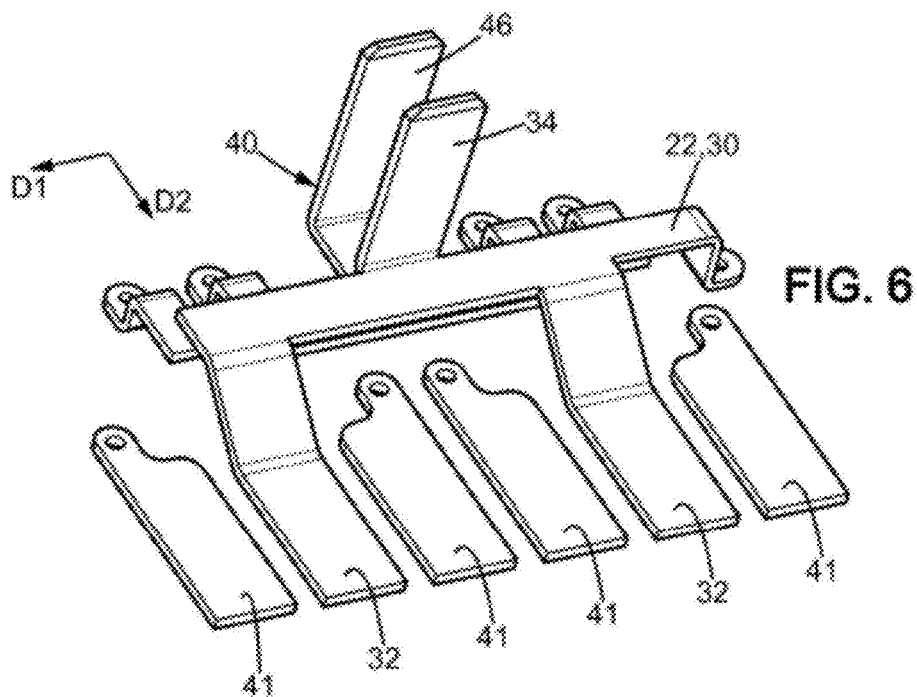
FIG. 6 is a perspective view of the electrical distribution busbar of the connection device according to the invention.

The second electrical distribution busbar 40 illustrated in FIGS. 1, 2 and 5 includes a second conductive strip 42, four attachment lugs 44 and a second conductive connection plug 46, which are rigidly connected to the same longer edge of the second strip 42.

Figure 7:
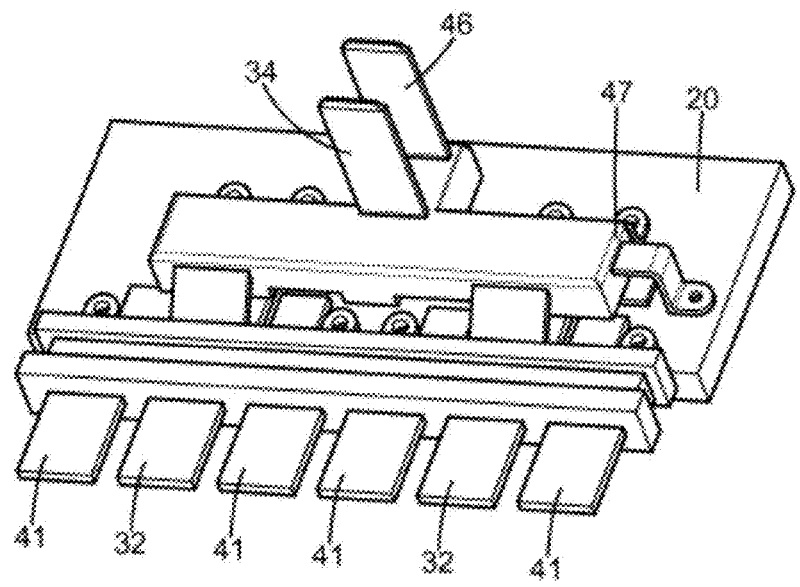
FIG. 7 is a perspective view of the connection device according to the invention.

As shown in FIG. 1, the second strip 42 is elongated in the first direction D1. It lies, as can be seen in FIG. 2, in a fourth plane P4 parallel to the first plane P1 and located therebelow. Thus, the second electrical distribution busbar 40 is arranged below and away from the first strip 30. An insulating material is overmolded 47 or coated around the first electrical distribution busbar 22 and the second electrical distribution busbar 40 so as to be able both to electrically insulate the first electrical distribution busbar 22 from the second electrical distribution busbar 40 and from the second tabs 41 and to rigidly connect the first electrical distribution busbar 22, the second electrical distribution busbar 40 and the second tabs 41. This overmoulding 47 can be seen only in FIG. 7.

The attachment lugs 44 allow both the second electrical distribution busbar 40 to be attached to the electronic board 20 and an electrical contact to be made between the conductive track 26 and the second electrical distribution busbar 40. The attachment lugs 44 form the electrical linkage with the conductive track 26. Each attachment lug 44 takes the form of a step with respect to the second strip 42. In particular, as can be seen in FIG. 5, each one includes a proximal portion 48 that is linked to the second strip 42 and bent with respect thereto, and a distal portion 50 that is bent with respect to the proximal portion 48. In particular, the proximal portion 48 extends perpendicularly to the second strip 42. The distal portion 50 extends in parallel to the second strip in the plane P2. Each distal portion 50 has an opening for attachment to a conductive track 26 of the electronic board.

The second conductive connection plug 46 takes the form of a bend. As can be seen in FIG. 2, a lower portion is rigidly connected to the second strip 42 and lies in the plane P4. The upper portion lies in a plane P5 that is substantially orthogonal to the plane P2 of the second strip 42. The plane P5 is parallel to the plane P3. The second plug 46 is intended for connection to the second pad 12 via electrical linkages (not shown).

Advantageously, the positioning of the second electrical distribution busbar below the first electrical distribution busbar 22 allows a compact connection device to be formed.

The second conductive tabs 41 are intended to be brought into electrical contact with the electrical contacts 18 of the heating modules. The second tabs 41 are formed by planar plates. They are elongate in shape and extend in the direction D2. The second tabs 41 have a main plane that lies in the same plane P2 as the main plane of the first tabs 32. Each second tab 41 is attached by one of its ends 52 to the conductive track 26, via an attachment opening and an attachment element. The free end 54 of each second tab 41 protrudes with respect to an inner face of the heating device housing 13.

Each conductive track 26 electrically connects a second tab 41 to an attachment lug 44 of the second electrical distribution busbar 40 in order to transmit power from the second plug 46 to the second tabs 41. In order to be able to selectively supply power to one or the other of the second tabs, a switch 28, which is preferably an electronic switch such as for example a MOSFET switch, is connected to each conductive track 26. This switch 28 allows or prevents the flow of the electric current between each second tab 41 and the second electrical distribution busbar 40. The switches 28 are controlled by the control unit, via drivers.

In the embodiment illustrated in FIG. 1, the first 32 and the second 41 conductive tabs are arranged from top to bottom in the following order: second tab 41, first tab 32, second tab 41, second tab 41, first tab 32 and second tab 41.

In particular, in this embodiment, the three upper conductive tabs form a first assembly 56. The three lower conductive tabs form a second assembly 58. In each assembly 56, 58, a first conductive tab 32 is arranged between two second conductive tabs 41.

At the interface between the first assembly 56 and the second assembly 58, a second tab 41 of one assembly is located beside a second tab 41 of the other assembly.

Lastly, in one and the same assembly, the distance between a first tab 32 and a second tab 41 is equal to the distance between this first tab 32 and the other second tab 41. This distance is also equal to the defined distance d between two electrical contacts 18, 19 of the heating modules.

This arrangement allows the heating device 8 to be fitted with either a heating module 7 having two rows 16 of elements capable of exchanging heat and a heating module 6 having three rows 16 of elements capable of exchanging heat, as illustrated in FIG. 1, or two heating modules 6 having three rows 16 of elements capable of exchanging heat, as illustrated in FIG. 3.

In the case of an assembly of a heating module 7 having two rows of elements capable of exchanging heat and of a heating module 6 having three rows of elements capable of exchanging heat, the heating modules may be positioned according to four different arrangements.

Specifically, the heating module 6 having three rows of elements capable of exchanging heat may be positioned against the three upper conductive tabs 32, 41, considering the representation of FIG. 1. In this case, the heating module 7 having two rows of elements capable of exchanging heat may be positioned against the two lower conductive tabs 32, 41 as can be seen in FIG. 1, or against the fourth tab 41 and the fifth tab 32, counting the tabs from top to bottom.

The heating module 6 having three rows of elements capable of exchanging heat may be positioned against the three lower conductive tabs 41, 32. In this case, the heating module 7 having two rows of elements capable of exchanging heat may be positioned against the two upper conductive tabs 32, 41 or against the second tab 32 and the third tab 41, counting the tabs from top to bottom.

These various positioning arrangements allow the same heating device 8 to be used in ventilation, heating and/or air-conditioning installations having various architectures. These various arrangements also allow the heat received by various air layers in one and the same ventilation, heating and/or air-conditioning installation to be modified. Thus, provision may be made for a given installation to heat the air layer located at the bottom of the housing of the installation more substantially, since this air layer will subsequently be directed, for example by means of a vent, towards a footwell.

When the heating modules 6, 7 are mounted in the heating device 8, the second conductive tabs 41 which are not electrically connected to electrical contacts 18, 19 of the heating modules are not electrically connected to the corresponding pads 10, 12 of the power supply source. These second conductive tabs 41 may be electrically disconnected from the electrical contacts 18, 19 by means of one or more switches.

In the embodiment illustrated in FIGS. 1 and 2, the distance between the lower tab 41 of the first assembly 56 and the upper tab of the second assembly 58 is also equal to the distance d. Thus, the connection device shown in these figures could also be fitted with a heating module having a single row 16 of elements capable of exchanging heat and with a heating module having four rows of elements capable of exchanging heat if the electrical contacts of these rows of elements capable of exchanging heat are spaced apart by the distance d.

The invention claimed is:

1. An electrical connection device for electrical connection of a first pad and a second pad of an electrical power supply source and electrical contacts of heating modules, the first pad being at a first electrical potential that is different from that of the second pad, said electrical connection device comprising:
   N first conductive tabs, where N is a natural integer greater than or equal to 1, electrically connected to the first pad and to at least one electrical contact of at least one first heating module; and
   2N second conductive tabs electrically connected to the second pad, and to other electrical contacts of at least one second heating module,
   wherein the electrical connection device is electrically capable of:
      electrically connecting the first pad and the second pad and the electrical contacts of a single heating module, and
      electrically connecting the first pad and the second pad and the electrical contacts of a plurality of heating modules,
      the number of the electrical contacts of the single heating module and of each of the plurality of heating modules being able to vary, and
   wherein at least two assemblies of conductive tabs are arranged side by side, each assembly of the at least two assemblies comprising a first conductive tab of the N first conductive tabs arranged between two second conductive tabs of the 2N second conductive tabs.

2. The electrical connection device as claimed in claim 1, wherein the number of electrical contacts of a heating module is comprised between two and the total number of conductive tabs of the connection device.

3. The electrical connection device as claimed in claim 1, the electrical connection device being connected to at least one heating module in a first configuration in which all of the conductive tabs are electrically connected to electrical contacts of the one or more heating modules, and a second configuration in which only a portion of the conductive tabs is electrically connected to electrical contacts of the one or more heating modules.

4. The electrical connection device as claimed in claim 1, wherein the conductive tabs are capable of being electrically disconnected from the corresponding pads of the power supply source.

5. The electrical connection device as claimed in claim 4, wherein when the conductive tabs are connected to heating modules in the second configuration, the conductive tabs which are not electrically connected to electrical contacts of the heating modules are electrically disconnected from the corresponding pads of the power supply source.

6. The electrical connection device as claimed in claim 1, comprising a first conductive tab arranged between two second conductive tabs.

7. The electrical connection device as claimed in claim 1, comprising two second conductive tabs arranged side by side.

8. The electrical connection device as claimed in claim 1, wherein in one and the same assembly, the distance between the first conductive tab and one of the second conductive tabs is equal to the distance between the first conductive tab and the other of the second conductive tabs.

9. The electrical connection device as claimed in claim 1, wherein the first conductive tabs and the second conductive tabs have a main plane that lies in the same plane.

10. The electrical connection device as claimed in claim 1, wherein the second conductive tabs are connected to ground or to a negative electrical potential.

11. The electrical connection device as claimed in claim 1, wherein the second conductive tabs are connected to a positive electrical potential.

12. A heating device for heating an airflow circulating inside one or more of a ventilation, heating, and air-conditioning installation, said heating device comprising:
- a housing;
- an electrical connection device as claimed in claim 1 mounted in the housing; and
- at least one heating module comprising at least two electrical contacts.

13. A motor vehicle including at least one heating device as claimed in claim 12.

* * * * *